(12) United States Patent
Zerza et al.

(10) Patent No.: US 7,149,697 B2
(45) Date of Patent: Dec. 12, 2006

(54) PRINTER-BASED CONSUMABLES PRICE SEARCHING

(75) Inventors: Wendy L. Zerza, Boise, ID (US); Vincent C. Skurdal, Boise, ID (US); Boyd Wilkes, Nampa, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 554 days.

(21) Appl. No.: 10/287,944

(22) Filed: Nov. 4, 2002

(65) Prior Publication Data
US 2004/0088178 A1 May 6, 2004

(51) Int. Cl.
*G06Q 99/00* (2006.01)
(52) U.S. Cl. ............... 705/1; 705/14; 705/26; 705/27
(58) Field of Classification Search ............ 705/26–27, 705/400, 1; 347/228
See application file for complete search history.

(56) References Cited

U.S. PATENT DOCUMENTS

| 6,125,361 A | 9/2000 | Chakrabarti et al. |
| 6,405,178 B1 | 6/2002 | Manchala et al. |
| 2002/0032611 A1 | 3/2002 | Khan |
| 2002/0039133 A1* | 4/2002 | Fukushima et al. ......... 347/228 |
| 2002/0042747 A1* | 4/2002 | Istvan ........................ 705/26 |

FOREIGN PATENT DOCUMENTS

| JP | 2003186651 A | * | 7/2003 |
| KR | 2003087145 A | * | 11/2003 |

OTHER PUBLICATIONS

Peck, Gretchen Kirby, "Opportunities Abound for Big Printing", Sep. 2002, Digital Publishing Solutions, 8 pgs.*
Apr. 26, 2004 Search Report for GB Application No. 0325594.0.

* cited by examiner

*Primary Examiner*—John W. Hayes
*Assistant Examiner*—Freda A Nelson

(57) ABSTRACT

A printer comprising one or more consumables and a network connection searches a network connected via the network connection for pricing for the one or more consumables. A user is notified when pricing below a user-specified amount is found.

50 Claims, 3 Drawing Sheets

PRINTER-BASED CONSUMABLES PRICE SEARCHING

FIELD OF THE INVENTION

The invention relates generally to printers, and more specifically to a system relating to printer-based consumables price searching.

BACKGROUND OF THE INVENTION

Printers typically print by depositing a consumable opaque substance on a page, such as toner deposited on a printed page in a laser printer or ink deposited on a printed page in an inkjet printer. Such consumables are replaced on a periodic basis as they are depleted, and are desirably user-replaceable or serviceable items. Laser printers, for example, typically have toner cartridges containing toner that a user can easily remove and replace. Similarly, inkjet printers typically have ink cartridges that a user can remove and replace.

Because printer users usually replace consumables such as toner cartridges, ink cartridges, and paper themselves, it is often up to the user of the printer to shop for and acquire replacement consumables when a printer's supply is depleted. As with any commodity item, the consumer is likely to select a replacement based on perceived quality and on cost. Even when a manufacturer's consumable product is to be purchased to ensure quality and compatibility, pricing can vary significantly from vendor to vendor and make price comparison worthwhile.

Certain Internet web sites enable consumers to seek out the lowest prices on various printer-related consumable items such as paper, ink cartridges, and toner cartridges, but they require a manual search and evaluation of the results to determine to what extent they meet a consumer's needs. They also require a user to actively seek out prices on a periodic basis, check a variety of sources, and keep track of and analyze the discovered information.

SUMMARY OF THE INVENTION

In one embodiment of the invention, a printer comprising one or more consumables and a network connection searches a network connected via the network connection for pricing for the one or more consumables. In a further embodiment, a user is notified when pricing below a user-specified amount is found, the notification comprising printing an order form or opening a popup window on an attached personal computer in various embodiments. In another embodiment, the network is searched for pricing when consumables within the printer reach a predetermined level.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the scope of the present invention. The following detailed description is, therefore, not to be taken in a limiting sense, and the scope of the invention is defined only by the appended claims.

The present invention assists a user in searching for pricing on printer-Related consumables in some embodiments via a module operable to search a network via the printer's network connection for pricing for the one or more consumables. In further embodiments of the invention, a user is notified when pricing below a user-specified amount is found, the notification comprising printing an order form or opening a popup window on an attached personal computer in various embodiments. In another embodiment, the network is searched for pricing when consumables within the printer reach a predetermined level.

Figure 1:
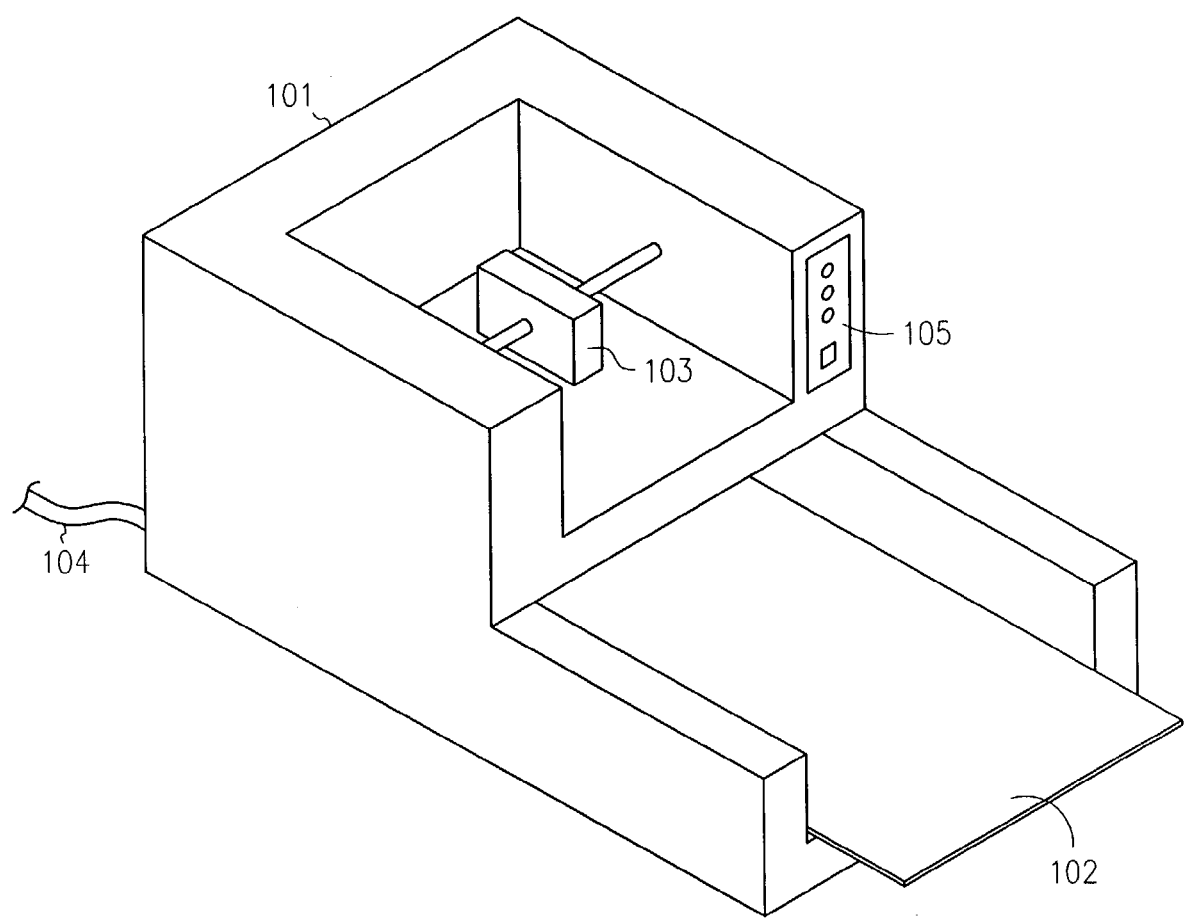
FIG. 1 is a block perspective view of an inkjet printer having features consistent with an embodiment of the present invention.

FIG. 1 illustrates an inkjet printer 101, consistent with some embodiments of the present invention. The inkjet printer uses various consumables, including paper 102 and ink cartridge 103, that must be replaced as they are depleted for continued printer operation. The printer 101 further has a network connection 104, which connects the printer to one or more local user's computers, and to the Internet. A printer control module 105 provides the various control functions of the printer, including the ability to communicate via network connection 104 and to print.

In operation, the printer is operable to search a network via network connection 104 for consumables pricing. In one embodiment, a printer user specifies a desired price for each of the various consumables such as paper or ink cartridges, and the printer searches the network for pricing that is equal or lower to the desired price. The printer in further embodiments notifies the user upon finding the desired pricing, such as by printing out an order form or by opening a popup window on the user's computer via the printer driver. In alternate embodiments, the printer simply searches for the lowest available pricing for each of the various desired consumables, and notifies the user of the lowest found price.

The printer in some embodiments of the invention searches the network for consumables pricing on a periodic basis, such as once a week or once per month. In alternate embodiments, searching for pricing is dependent on use of the consumables, such as searching for ink cartridge pricing only when the current ink cartridge is nearly depleted. In a yet further embodiment of the invention, consumable pricing is searched at the direction of the user, such that the user must indicate when supply of a consumable such as paper is low enough to require reordering of that consumable.

The method used to search for pricing, to notify the user of pricing, and to order each consumable is in some embodiments of the invention independently configurable for each of the various consumables in the printer. For example, in one embodiment of the invention ink cartridge pricing is searched when the present ink cartridge 103 reaches a predetermined state of depletion, and a new cartridge meeting predetermined pricing criteria is automatically ordered.

In the same example embodiment, paper pricing is searched so that the user may be notified of paper pricing via a printed page or popup window only after the printer has printed approximately a number of pages corresponding to the size of the immediately preceding paper order. The user then determines the need for paper, and orders paper accordingly.

Operation of the printer consistent with the present invention need not require the use of a personal computer. In some embodiments of the invention, desired pricing may be entered directly to the printer such as via the control panel of the printer control module 105, and the control panel may be used to configure other aspects of the consumables pricing features of the printer. In other embodiments of the invention the printer network connection is made via a computer, such as via a software driver on a computer with a network connection where the printer is directly attached to the computer.

Figure 2:
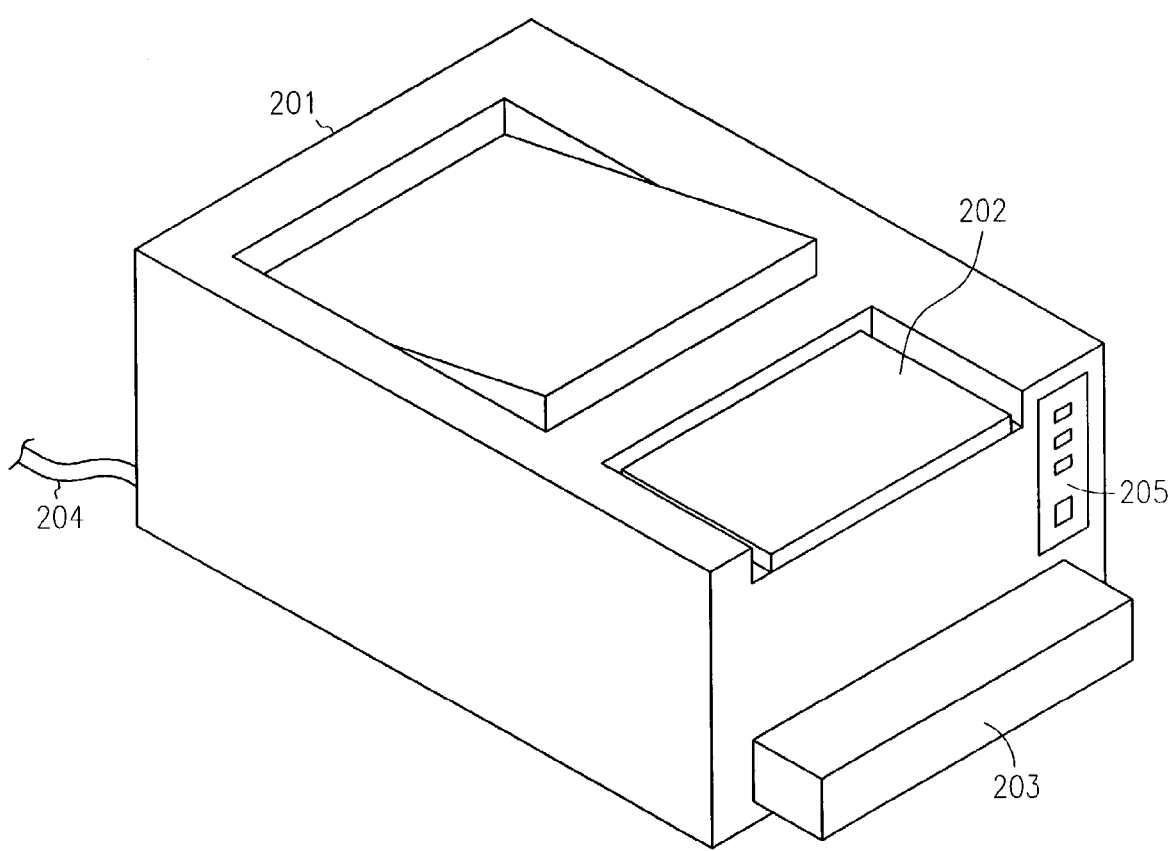
FIG. 2 is a block perspective view of a laser printer having features consistent with an embodiment of the present invention.

FIG. 2 illustrates a laser printer 201, which functions in various embodiments of the invention much like the inkjet printer 101 of FIG. 1 but prints with consumable toner from a toner cartridge 202. The laser printer also uses paper from paper tray 203, and is attached to one or more computers via printer connection 204.

In some embodiments of the invention a printer such as laser printer 201 is not attached directly to the Internet or another such network but is attached to a single computer via printer connection 204. In such embodiments, printer connection 204 may take the form of a parallel cable connection such as Institute of Electrical and Electronic Engineers (IEEE) 1284 bidirectional parallel connection, a Universal Serial Bus (USB) connection, or a firewire (IEEE 1384) connection. The printer communicates with a printer control module, or printer driver, executing as software within the attached computer, such that the printer control module within the attached computer is operable to search consumables pricing via the computer's network connection. In some such embodiments, the printer control module 205 within the printer communicates with the printer control module, or printer driver, executing within the computer both to print pages and to perform consumables pricing functions.

Figure 3:
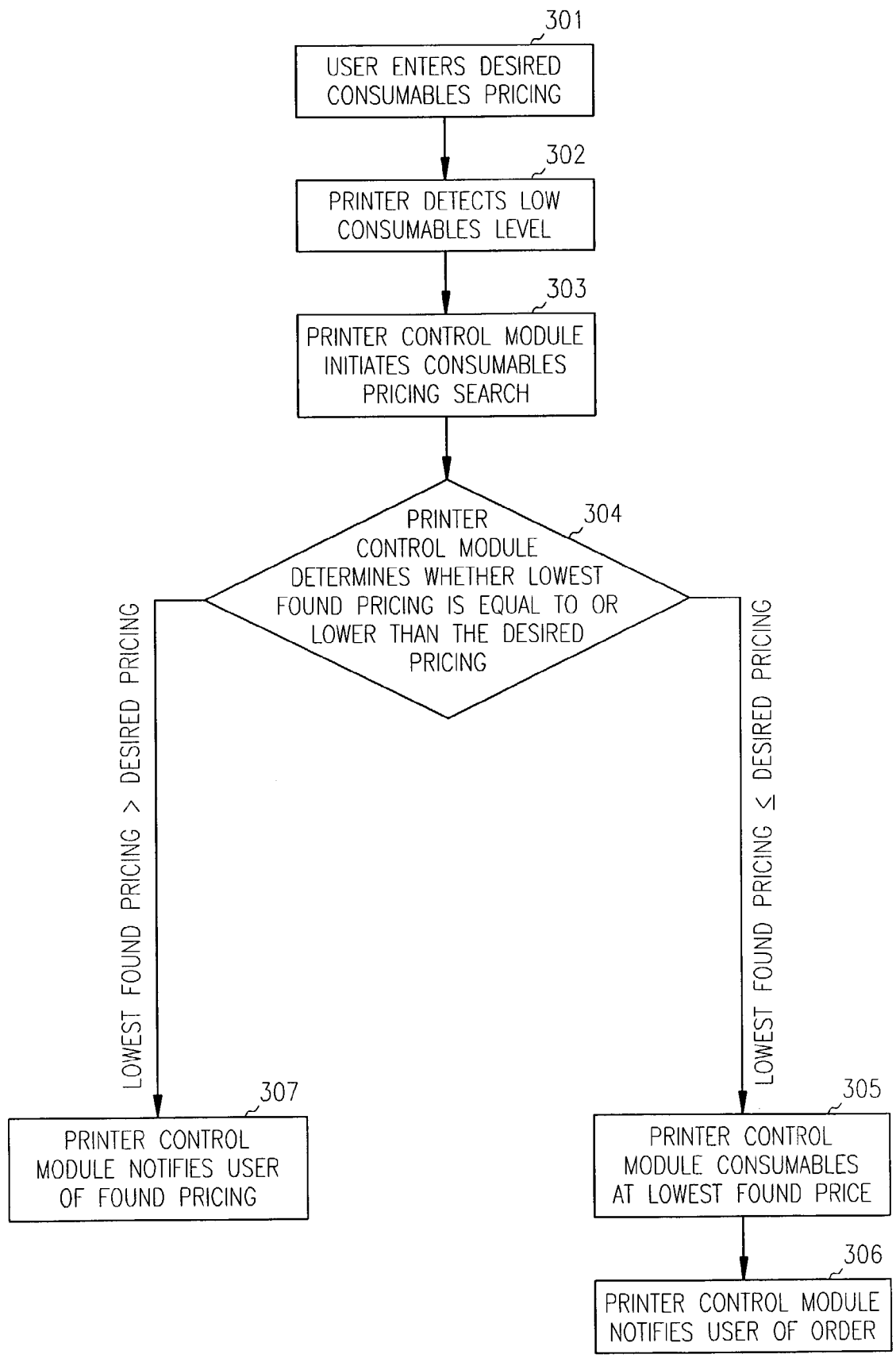
FIG. 3 is a flowchart illustrating a method of practicing one embodiment of the present invention.

FIG. 3 illustrates one example method of practicing the present invention. At 301, a user of the printer enters desired pricing for consumables such as paper, ink, or toner cartridges. When the printer detects a low or depleted level of one of the consumables at 302, the printer control module initiates a consumables pricing search at 303. In some embodiments of the invention, the consumables depletion level that triggers a pricing search is configured by the user.

At 304, the printer control module determines whether the lowest found pricing from the consumables pricing search initiated at 303 is equal to or lower than the desired consumables pricing the user entered at 301. If the lowest found pricing is equal to or lower than the desired pricing, the printer control module orders the depleted consumables at the lowest found price at 305. In further embodiments of the invention, the printer is operable to search for the lowest available pricing if no user pricing is entered. The printer control module then notifies the user of the order at 306, such as by printing an order summary page or by opening a popup window on the user's attached computer via a printer driver or printer control module component executing on the computer.

If the lowest found pricing is higher than the user's desired consumables pricing, the printer notifies the user of the lowest found pricing at 307, but does not order the consumables at a higher than desired price. The notification in various embodiments of the invention includes printing a notification page or opening a popup window on the user's attached computer via a printer driver or printer control module component. The user may then determine whether to order the consumables at the found pricing, and may do so independently, may direct the printer to order the consumables, or may decide to shop further for the depleted consumables.

In further embodiments of the invention, consumables are identified and ordered based not only on the lowest found pricing but also on availability, or whether a particular consumable is in stock. In various embodiments, the user is notified of both the lowest found pricing and the lowest found price that is known to be available, or of just the lowest found price that is known to be available. The printer control module in other embodiments orders the lowest-priced available consumable found, or prints an order form for the lowest-priced available consumable found.

The consumables pricing search can take any form, but several embodiments are discussed here as examples. In one embodiment of the invention, a compilation of consumables pricing is assembled and maintained by an outside agent, and the results are maintained on an Internet website or other medium such that the pricing information can be accessed in practicing the present invention when consumables pricing information is searched. In one example, a printer control module would access a Hewlett-Packard consumables pricing database and read the compiled consumables pricing information from the database as an element of its searching a network for consumables pricing.

In an alternate embodiment, searching a network for consumables pricing comprises querying one or more Internet-based price comparison services. A variety of Internet websites exist that allow a user to search a price database for one or more specific items, including hardware, software, and related consumables. In one example of such an embodiment, a printer control module queries several predetermined price comparison services for pricing on a printer consumable by querying pricing from each price comparison service using a specific part number for the desired consumable. The results of the queries are then combined and presented to the user such as by printing a results page or opening a popup window via a printer driver executing on an attached computer.

In other embodiments of the invention, searching the network for consumables pricing comprises searching the Internet, or a portion of the Internet such as the World-Wide Web, for a particular consumable and related pricing. In one such embodiment, a website search for a particular consumable item's part number is conducted, and corresponding pricing information is retrieved and parsed. In an alternate embodiment, only specific domains are searched for pricing, such that only approved vendors of consumables will be included in the consumables price search results.

Limiting the consumables price searching to specific part numbers, specific domains, or specific vendors in some embodiments of the invention provides some degree of quality assurance to a printer user and to the printer manufacturer. It is in the best interest of a printer manufacturer to ensure that users of the manufacturer's printers do not find fault with their printers as a result of using inferior consumables that the manufacturer has not qualified or approved. For this and other reasons, some embodiments of the invention will comprise various limitations on the scope of the consumables price search.

The search itself is conducted in various embodiments of the invention by a printer, by a printer control module operating within the printer, by a printer driver or printer control module executing on an attached personal computer, and in other elements of the printer. In one specific embodiment, a Java virtual machine executes within a printer control module comprising part of a printer, such that the Java virtual machine is operable to execute Java applications that implement select functions such as the searching for consumables pricing of the present invention.

The various example embodiments of the invention described herein illustrate how the various embodiments function to search a network for pricing for printer consumables. The detailed examples further illustrate how various embodiments are operable to notify a user when pricing below the user's desired amount is found, and to print an order form or open a popup window on an attached personal computer in various embodiments.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A printer, comprising:
    one or more consumables;
    a network connection;
    a module operable to automatically connect to the network, automatically search the network via the printer's network connection, automatically query plural price comparison shopping search engines, automatically control quality assurance by limiting the query to specific part numbers, specific domains, and specific vendors and automatically evaluate pricing from the limited query for the one or more consumables without a manual search request from a user; and
    an order module configured to automatically order one or more consumables from the limited query that have prices within a predefined price range.

2. The printer of claim 1, wherein the module is further operable to notify a user of pricing search results.

3. The printer of claim 1, wherein the module operable to search searches the network for consumable prices below a user's desired amount, and notifies the user when such a price is found.

4. The printer of claim 3, wherein the notification to the user comprises printing a notification.

5. The printer of claim 4, wherein the notification comprises an order form.

6. The printer of claim 3, wherein the notification to the user comprises a popup window on an attached computer.

7. The printer of claim 1, wherein the one or more consumables comprise a toner cartridge.

8. The printer of claim 1, wherein the one or more consumables comprise an inkjet cartridge.

9. The printer of claim 1, wherein the module operable to search a network for pricing searches the network for pricing when consumables within the printer reach a predetermined level.

10. The printer of claim 1, wherein the module operable to search a network via the printers network connection for pricing for the one or more consumables searches for pricing for consumables that are currently available for order.

11. The printer of claim 1, wherein the network connection comprises a connection to another electronic device which is connected to a network.

12. The printer of claim 1, the module further operable to order one or more consumables based on searched pricing.

13. A printer controller comprising:
    a connection to a network;
    a module operable to automatically connect to the network, automatically search the network via the printers network connection, automatically query plural price comparison shopping search engines, automatically control quality assurance by limiting the query to specific cart numbers, specific domains, and specific vendors and automatically evaluate pricing from the limited query for the one or more consumables without a manual search request from a user; and
    an order module configured to automatically order one or more consumables from the limited query that have prices within a predefined price range.

14. The printer controller of claim 13, the module further operable to notify a user of pricing search results.

15. The printer controller of claim 13, wherein the module operable to search searches the network for consumable prices below a user's desired amount, and notifies the user when such a price is found.

16. The printer controller of claim 15, wherein the notification to the user comprises printing a notification.

17. The printer controller of claim 16, wherein the printed notification comprises an order form.

18. The printer controller of claim 15, wherein the notification to the user comprises a popup window on an attached computer.

19. The printer controller of claim 13, wherein the one or more consumables
    comprise a toner cartridge.

20. The printer controller of claim 13, wherein the one or more consumables comprise an inkjet cartridge.

21. The printer controller of claim 13, wherein the module operable to search a network for pricing searches the network for pricing when consumables within the printer reach a predetermined level.

22. The printer controller of claim 13, wherein the module operable to search a network for pricing searches the network for pricing for consumables that are currently available for order.

23. The printer controller of claim 13, wherein the connection to a network comprises a connection to another electronic device which is connected to a network.

24. The printer controller of claim 13, the module further operable to order one or more consumables based on searched pricing.

25. A method of searching consumables pricing for a printer, comprising:
    automatically connecting to a network, automatically searching the network via a network connection of the printer, automatically querying plural price comparison shopping search engines, automatically controlling quality assurance by limiting the query to specific part numbers, specific domains, and specific vendors and automatically evaluating pricing from the limited query for one or more consumables without a manual search request from a user; and
    automatically ordering one or more consumables from the limited query that have prices within a predefined price range.

26. The method of claim 25, further comprising notifying a user of pricing search results.

27. The method of claim 25, further comprising:
determining whether the pricing for one or more consumables are below a user's desired amount.

28. The method of claim 27, further comprising:
notifying the user when pricing below a user's desired amount is found.

29. The method of claim 28, wherein notifying the user comprises printing a notification.

30. The method of claim 29, wherein the printing the notification comprises printing an order form.

31. The method of claim 28, wherein notifying the user comprises opening a popup window on an attached computer.

32. The method of claim 25, wherein the one or more consumables comprise a toner cartridge.

33. The method of claim 25, wherein the one or more consumables comprise an inkjet cartridge.

34. The method of claim 25, wherein searching the network for pricing for one or more consumables occurs when consumable levels within the printer reach a predetermined level.

35. The method of claim 25, wherein searching the network for pricing comprises searching the network for pricing for consumables that are currently available for order.

36. The method of claim 25, wherein the network connection of the printer comprises a connection from the printer to another electronic device which is connected to a network.

37. The method of claim 25, further comprising ordering one or more consumables based on searched pricing.

38. A machine-readable medium with instructions thereon, the instructions when executed operable to cause a printer controller to:
automatically connect to a network, automatically search the network via a network connection of the printer controller, automatically querying plural price comparison shopping search engines, automatically controlling quality assurance by limiting the query to specific part numbers, specific domains, and specific vendors and automatically evaluate pricing from the limited query for one or more consumables without a manual search request from a user; and
automatically ordering one or more consumables from the limited query having prices within a predefined price range.

39. The machine-readable medium of claim 38, the instructions when executed further operable to notify a user of pricing search results.

40. The machine-readable medium of claim 38, the instructions when executed further operable to:
determine whether the pricing for the one or more consumables is below a user's desired amount.

41. The machine-readable medium of claim 40, the instructions when executed further operable to:
notify the user when pricing below a user's desired amount is found.

42. The machine-readable medium of claim 41, wherein notifying the user comprises printing a notification.

43. The machine-readable medium of claim 42, wherein the printing the notification comprises printing an order form.

44. The machine-readable medium of claim 41, wherein notifying the user comprises opening a popup window on an attached computer.

45. The machine-readable medium of claim 38, wherein the one or more consumables comprise a toner cartridge.

46. The machine-readable medium of claim 38, wherein the one or more consumables comprise an inkjet cartridge.

47. The machine-readable medium of claim 38, the instructions when executed further operable to:
determine when consumables within a printer reach a predetermined amount; and
search a network via a network connection of the printer controller for pricing for one or more consumables when the consumables within the printer reach the predetermined amount.

48. The machine-readable medium of claim 38, wherein searching a network for pricing comprises for pricing searching for pricing for consumables that are currently available for order.

49. The machine readable medium of claim 38, wherein the network connection of the printer comprises a connection from the printer to another electronic device which is connected to a network.

50. The machine readable medium of claim 38, the instructions when executed operable to cause a printer controller to order one or more consumables based on searched pricing.

* * * * *

UNITED STATES PATENT AND TRADEMARK OFFICE
CERTIFICATE OF CORRECTION

| | |
|---|---|
| PATENT NO. | : 7,149,697 B2 |
| APPLICATION NO. | : 10/287944 |
| DATED | : December 12, 2006 |
| INVENTOR(S) | : Wendy L. Zerza et al. |

It is certified that error appears in the above-identified patent and that said Letters Patent is hereby corrected as shown below:

In column 5, line 64, in Claim 10, delete "printers" and insert -- printer's --, therefor.

In column 6, line 9, in Claim 13, delete "printers" and insert -- printer's --, therefor.

In column 6, line 13, in Claim 13, delete "cart" and insert -- part --, therefor.

Signed and Sealed this

Eighteenth Day of August, 2009

David J. Kappos
*Director of the United States Patent and Trademark Office*